United States Patent Office 3,231,285
Patented Jan. 25, 1966

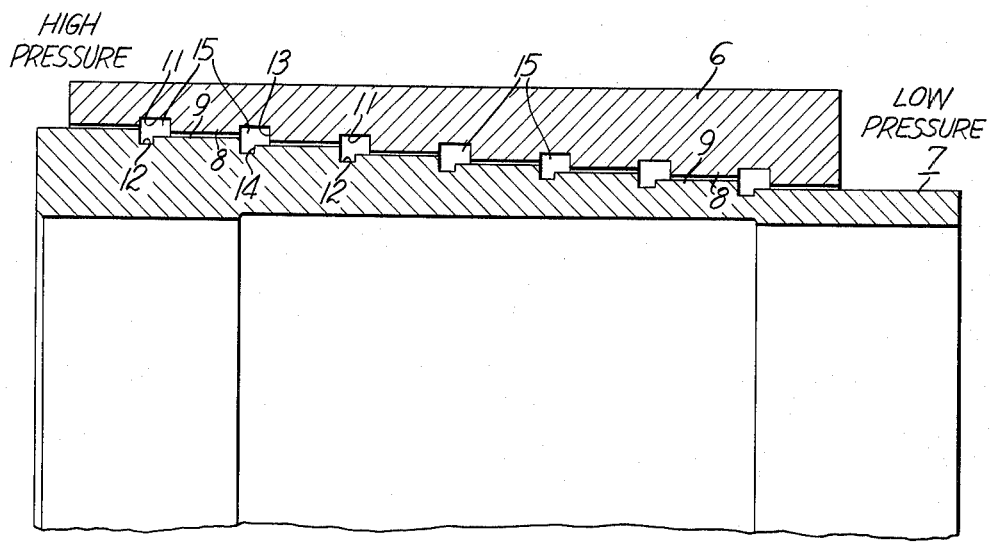

3,231,285
ROTARY SHAFT SEAL
Wilton W. Weltmer and Milton W. Lutz, Wauwatosa, Wis., assignors to Allis-Chalmers Manufacturing Company, Milwaukee, Wis.
Filed Dec. 17, 1962, Ser. No. 245,043
3 Claims. (Cl. 277—53)

This invention pertains to rotary shaft seals and more particularly to rotary shaft seals of the limited leakage type.

In certain instances it is desirable to have a limited amount of leakage between relatively rotating elements. Probably the most common type of limited leakage shaft seal is the well-known labyrinth seal, wherein the fluid is exposed to a torturous flow path. In many instances a labyrinth type seal does not provide a sufficient resistance to flow and, therefore, excessive leakage results.

In the subject invention applicant has developed a limited leakage shaft seal wherein a large pressure drop can be accomplished over a relatively short length of the flow path. It is, therefore, a general object of the subject invention to provide a limited leakage shaft seal wherein the pressure differential between a high and low pressure area can be dissipated over a relatively short flow length.

A further object of the subject invention is to provide a limited leakage shaft seal wherein a restricted fluid passage is provided with a series of spaced surge chambers.

An additional object of the subject invention is to provide a limited leakage shaft seal of the hereinbefore described type wherein the entrance and exit to each surge chamber are so positioned as to resist the natural flow tendency of the fluid being sealed.

An additional object of the subject invention is to provide a limited leakage shaft seal of the hereinbefore described type wherein each adjacent surge chamber is of a successively decreasing diameter.

These and other objects of the subject invention will become more fully apparent as the following description is read in light of the attached drawing, wherein:

FIG. 1 is a partial cross section of a shaft seal constructed in accordance with the invention.

Referring to the drawing, an annular stationary bushing 6 is positioned about a rotary shaft generally designated 7. The bushing and shaft are each provided with a series of axially directed stepped portions 8 and 9. An annular groove 11 is provided between each adjacent stepped portion 8 of the bushing 6 and an annular groove 12 is provided between each adjacent stepped portion 9 of the shaft 7.

The bushing 6 and shaft 7 are relatively positioned so that the grooves 11 and 12 combine to form annular surge chambers 15. It should be noted that in the preferred embodiment shown herein, the downstream edges 13 of the grooves 11 are axially spaced in the low pressure area direction from the downstream edges 14 of the grooves 12 resulting in the irregularly shaped surge chambers 15. As explained later, this irregular shape contributes to the improved sealing characteristics of the seal.

In operation, high pressure fluid from a high pressure area passes through the channel defined by the stepped portions 8 and 9 of the bushing 6 and shaft 7 and jets into the surge chamber 15 whereupon it immediately strikes the downstream edge 13 of the first groove 11. The relatively large area of the surge chamber 15 causes an immediate pressure drop in the fluid. As the surge chamber is filled with fluid, pressure increases and it attempts to find an outlet to a lower pressure area which in this case is the next adjacent surge chamber in the low pressure area direction. However, centrifugal force acting on the fluid, because of its contact with the rotating shaft, forces the fluid radially outward in a direction substantially at right angles to the flow path to the adjacent surge chamber. Furthermore, since the low pressure edge 14 is axially spaced in the high pressure direction from the low pressure edge 13, the fluid cannot be flung into the channel connected to the next adjacent surge chamber.

When a surge chamber 15 is completely filled with fluid, the pressure will increase until the fluid finds its way through the annular channel into the next successive surge chamber. In each surge chamber there is a pressure drop and fluid flow is resisted by the centrifugal force action and the flow barrier imposed by the relative positioning of the edges 13 and 14 of the grooves 11 and 12.

Although only one embodiment of the subject invention is herein shown and described, various modifications will be obvious to those skilled in the art and it is intended that all such modifications as come within a reasonable interpretation of the appended claims be covered.

Having now particularly described and ascertained the nature of our said invention and the manner in which it is to be performed, we declare that what we claim is:

1. A rotary shaft seal for restricting fluid flow from a high pressure area to a low pressure area comprising: a rotary shaft having a plurality of axially spaced annular stepped portions thereon; a stationary bushing surrounding said shaft and having corresponding annular stepped portions on the inner periphery thereof, said bushing and said shaft defining a flow restricting stepped channel therebetween; a first set of axially spaced annular grooves in said shaft connecting adjacent stepped portions of said shaft; and a second set of axially spaced annular grooves in the inner surface of said bushing connecting adjacent stepped portions of said bushing, said first and second sets of annular grooves being in register with one another to form axially spaced annular surge chambers in flow communication with said channel, the low pressure edge of each groove of said second set of grooves being axially spaced in the low pressure area direction from the low pressure edge of the complementary groove of said first set of grooves.

2. The rotary shaft seal set forth in claim 1 wherein said stepped channel has an increasing diameter in a direction from said low pressure area to said high pressure area.

3. A rotary shaft seal for restricting fluid flow from a high pressure area to a low pressure area comprising: a rotary shaft including a portion having a decreasing diameter; a stationary bushing having a decreasing diameter surrounding said shaft portion, said shaft portion and said bushing defining an annular flow restricting channel therebetween, said flow restricting channel having an increasing diameter in a direction from said low pressure area to said high pressure area; a first set of axially spaced annular grooves on said shaft portion; and a second set of axially spaced annular grooves on the inner surface of said bushing in register with said first set of annular grooves to form axially spaced annular surge chambers in flow communication with said annular channel, the low pressure edge of each groove of said second set of grooves being axially spaced in the direction of said low pressure area from the low pressure edge of the complementary groove of said first set of grooves.

References Cited by the Examiner

UNITED STATES PATENTS

| | | | |
|---|---|---|---|
| 838,744 | 12/1906 | Parsons et al. | 277—17 |
| 897,189 | 8/1908 | Belluzzo | 277—56 X |

FOREIGN PATENTS

| | | |
|---|---|---|
| 538,984 | 3/1922 | France. |

LAVERNE D. GEIGER, *Primary Examiner.*

SAMUEL B. ROTHBERG, *Examiner.*